(12) United States Patent
Sakamaki

(10) Patent No.: US 7,692,917 B2
(45) Date of Patent: Apr. 6, 2010

(54) TRANSFORMING DEVICE

(75) Inventor: Tomohiko Sakamaki, Nagoya (JP)

(73) Assignee: DENSO CORPORATION, Kariya (JP)

( * ) Notice: Subject to any disclaimer, the term of this patent is extended or adjusted under 35 U.S.C. 154(b) by 52 days.

(21) Appl. No.: 12/071,184

(22) Filed: Feb. 19, 2008

(65) Prior Publication Data
US 2008/0204980 A1 Aug. 28, 2008

(30) Foreign Application Priority Data
Feb. 26, 2007 (JP) .............. 2007-045672

(51) Int. Cl.
*H05K 7/16* (2006.01)
(52) U.S. Cl. .............. 361/679.01; 361/679.27; 248/917
(58) Field of Classification Search ............ 361/679.01, 361/679.22, 679.27; 248/917
See application file for complete search history.

(56) References Cited

U.S. PATENT DOCUMENTS

| | | | | |
|---|---|---|---|---|
| 5,851,061 | A | * | 12/1998 | Hegarty ............ 362/20 |
| 7,062,197 | B2 | * | 6/2006 | Kunugi ............ 399/107 |
| 7,113,395 | B2 | * | 9/2006 | Hara et al. ........ 361/679.08 |
| 2002/0126110 | A1 | * | 9/2002 | Bowron ............ 345/204 |
| 2005/0144819 | A1 | | 7/2005 | Shimizu et al. |
| 2006/0096298 | A1 | * | 5/2006 | Barnicki et al. ...... 60/781 |
| 2007/0200962 | A1 | * | 8/2007 | Choi et al. ......... 348/794 |

FOREIGN PATENT DOCUMENTS

| | | |
|---|---|---|
| JP | A-H2-285578 | 11/1990 |
| JP | A-04-011537 | 1/1992 |
| JP | A-07-184742 | 7/1995 |
| JP | A-2004-046045 | 2/2004 |

OTHER PUBLICATIONS

Office Action dated Jan. 6, 2009 in corresponding JP application No. 2007-045672 (and English Translation).

* cited by examiner

*Primary Examiner*—Jayprakash N Gandhi
*Assistant Examiner*—Ingrid Wright
(74) *Attorney, Agent, or Firm*—Posz Law Group, PLC

(57) ABSTRACT

A transforming device includes: a body; a movable element movable between a storage position and a separate position, wherein the movable element is accommodated in the body when the movable element is disposed at the storage position, and wherein the movable element is separated from the body when the movable element is disposed at the separate position; a pushing element for pushing the movable element from the storage position to the separate position; and a pair of magnets. One magnet is disposed in the body, and the other magnet is disposed in the movable element. The pair of magnets generates auxiliary force for pushing the movable element from the storage position to the separate position.

17 Claims, 4 Drawing Sheets

TRANSFORMING DEVICE

CROSS REFERENCE TO RELATED APPLICATION

This application is based on Japanese Patent Application No. 2007-45672 filed on Feb. 26, 2007, the disclosure of which is incorporated herein by reference.

FIELD OF THE INVENTION

The present invention relates to a transforming device.

BACKGROUND OF THE INVENTION

Recently, in an in-vehicle device such as a vehicle navigation device and a vehicle audio device, the weight of a display as a transforming element becomes large since the dimensions of the display becomes large.

In JP-A-2005-47483 corresponding to US Patent Application Publication No. 2005-0144819, the in-vehicle device includes an auxiliary force generating element for assisting displacement of the display. The auxiliary force generating element is composed of a spring, an ejecting lever, a support member and the like. The ejecting lever receives elastic force of the spring so that the ejecting lever ejects the upper side of the display. The support member supports the ejecting lever.

When the display moves from a storage position to a separate position, the display is ejected forward with using a slide element, which is connected to a lower side of the display. At this time, the auxiliary force generated by the auxiliary force generating element is applied to the upper side of the display.

However, the auxiliary force generating element includes many members such as the spring, the ejecting lever and the support member. Assembling process of the auxiliary force generating element and mounting process of the auxiliary force generating element in the display are complicated so that manufacturing time of the display becomes longer.

Since the weight of the display is large, the auxiliary force generating element needs to generate large auxiliary force so that the display is smoothly moved, i.e., displaced. However, it is difficult to mount the spring capable of generating the large auxiliary force in a limited space of the in-vehicle device.

SUMMARY OF THE INVENTION

In view of the above-described problem, it is an object of the present disclosure to provide a transforming device.

According to a first aspect of the present disclosure, a transforming device includes: a body; a movable element movable between a storage position and a separate position, wherein the movable element is accommodated in the body when the movable element is disposed at the storage position, and wherein the movable element is separated from the body when the movable element is disposed at the separate position; a pushing element for pushing the movable element from the storage position to the separate position; and a pair of magnets. One magnet is disposed in the body, and the other magnet is disposed in the movable element. The pair of magnets generates auxiliary force for pushing the movable element from the storage position to the separate position.

A design of the above device is simple. Further, the pair of magnets can generate sufficient auxiliary force.

Alternatively, the transforming device may further include: an energization control element. One of the magnets is made of an electric magnet. The energization control element controls to energize the electric magnet in such a manner that repulsive force is generated between the pair of magnets when the pushing element pushes the movable element from the storage position to the separate position. The energization control element controls to energize the electric magnet in such a manner that attractive force is generated between the pair of magnets when the movable element is disposed at the storage position.

Alternatively, the transforming device may further include: a magnetic attractive force generating element for generating magnetic attractive force to attract the movable element toward the body. The magnetic attractive force generating element is disposed in at least one of the body and the movable element.

According to a second aspect of the present disclosure, a transforming device includes: a body; a movable element movable between a storage position and a separate position, wherein the movable element is accommodated in the body when the movable element is disposed at the storage position, and wherein the movable element is separated from the body when the movable element is disposed at the separate position; a slide element for pushing the movable element from the storage position to the separate position and for pulling the movable element from the separate position to the storage position; a permanent magnet disposed in the movable element; and an electric magnet disposed in the body. The electric magnet generates repulsive force between the electric magnet and the permanent magnet when the slide element pushes the movable element from the storage position to the separate position, and the electric magnet generates attractive force between the electric magnet and the permanent magnet when the movable element is disposed at the storage position.

A design of the above device is simple. Further, the pair of magnets can generate sufficient auxiliary force.

Alternatively, the movable element may be movable in two steps between the storage position and the separate position. One step is a first step, in which the movable element moves between the storage position and a tilt starting position, and the other step is a second step, in which the movable element moves between the tilt starting position and the separate position. The slide element pushes and pulls the movable element in the first step in such a manner that the movable element moves in parallel to a front surface of the body, and the slide element pushes and pulls the movable element in the second step in such a manner that the movable element tilts toward the front surface of the body.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
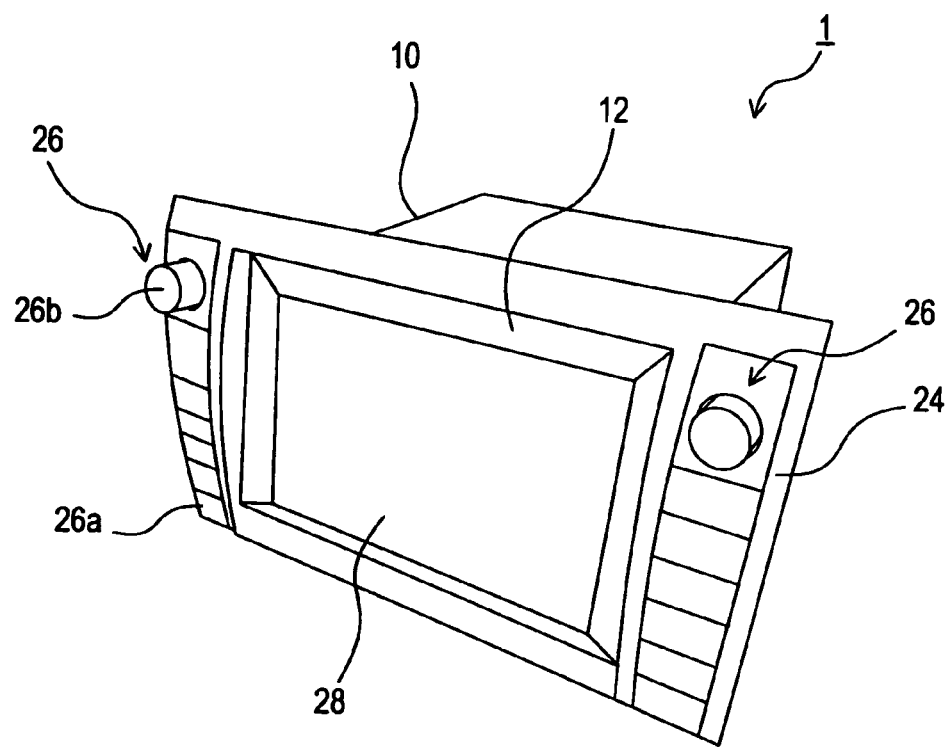
FIG. 1 is a perspective view showing an in-vehicle device according to an example embodiment of the present disclosure.
Figure 1:
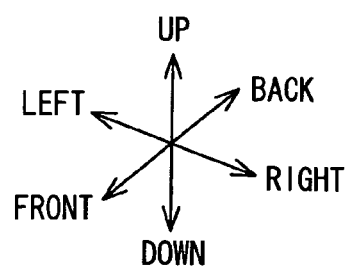

An in-vehicle device 1 as a transforming device is shown in FIG. 1. The device 1 includes a body 10 having a rectangular shape, a movable display 12, a driving element 14, a tilt element 16, a permanent magnet 18 and an electric magnet 20. The movable display 12 is movable along with a front-back direction of the device 1. The movable display 12 is arranged on a front side of the body 10. The driving element 14 displaces the movable display 12. The tilt element 16 tilts the display 12 toward the body 10. The permanent magnet 18 is disposed in the display 12, and the electric magnet 20 is disposed in the body 10.

The in-vehicle device 1 provides a vehicle navigation device and a vehicle audio device, which are integrated into the device 1. The vehicle navigation device directs a passenger to a destination. The audio device includes a CD player, a DVD player, a MD player and the like. The in-vehicle device 1 is disposed in an instrument panel of a vehicle. Specifically, the device 1 is disposed between a driver's seat and a passenger's seat.

Figure 2A:
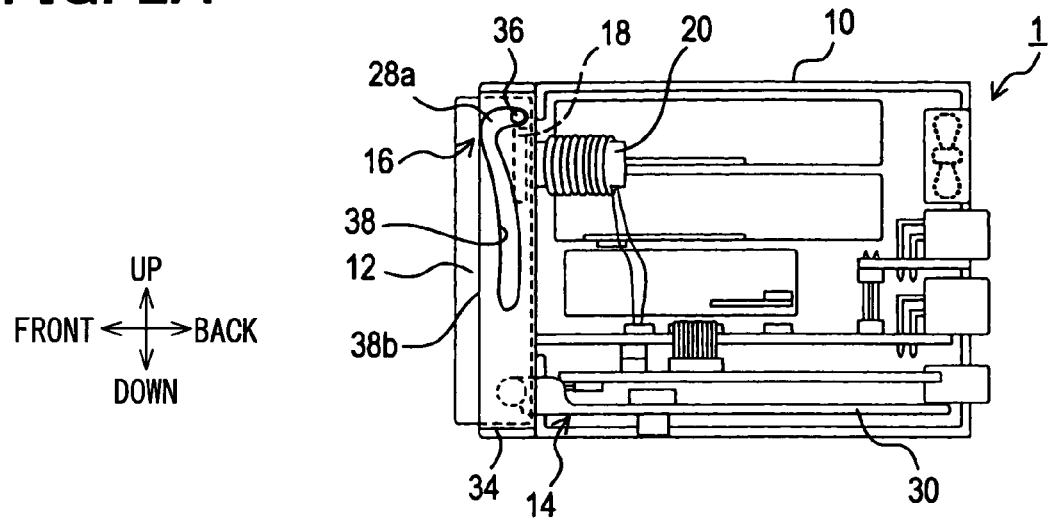
FIGS. 2A to 2C are cross sectional views showing various features of the in-vehicle device.
Figure 2B:
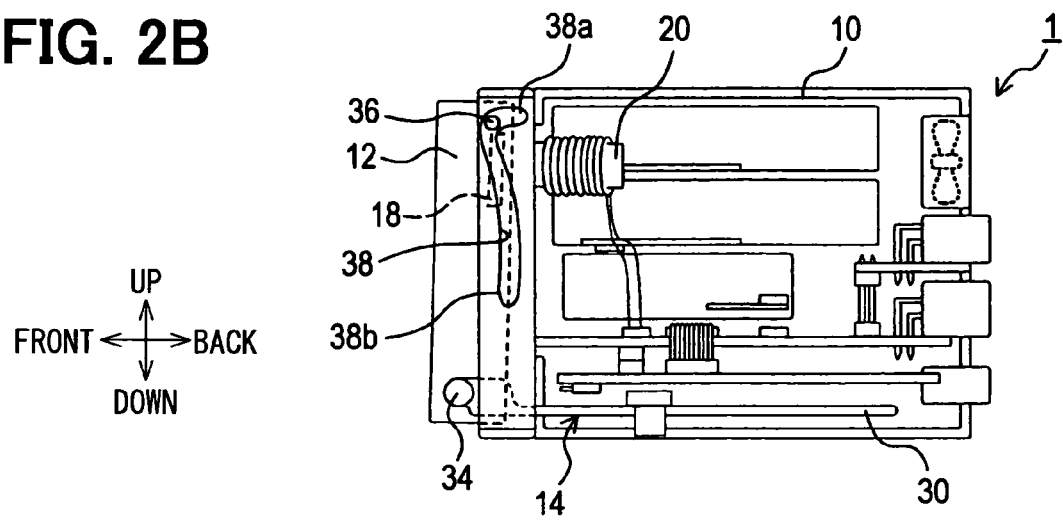
Figure 2C:
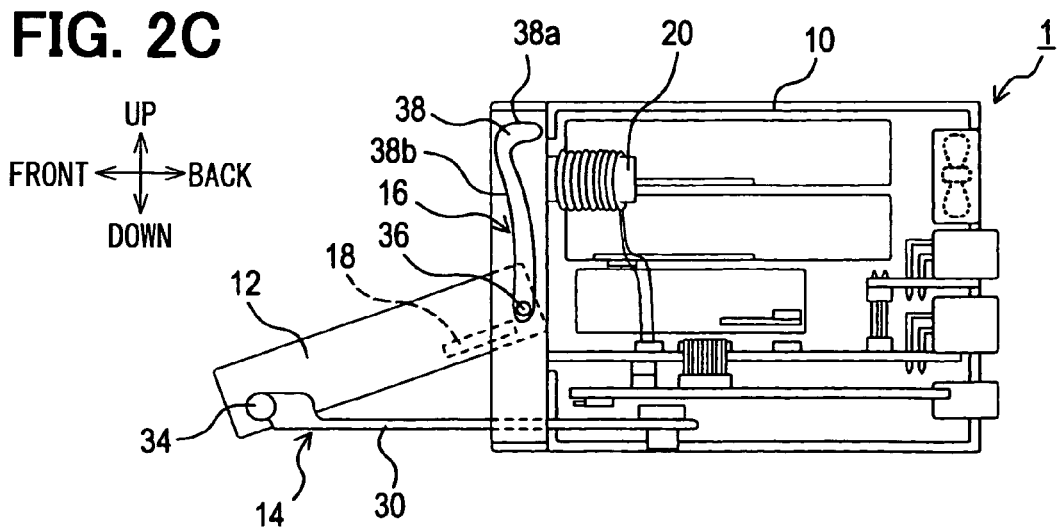
Figure 3:
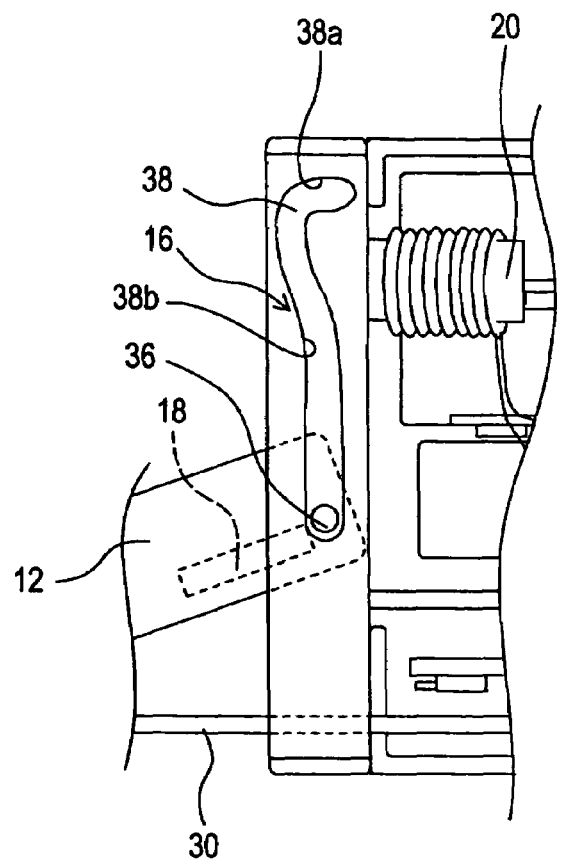
FIG. 3 is a side view showing a guide groove in the in-vehicle device.

Multiple slots (not shown) are formed on the front of the body 10, which is a display side surface. In FIGS. 2A to 2C, the number of slots is three, and a record media such as a CD, a DVD and a MD is inserted into the slot. When the display 12 is stored in the body 10, the slots are covered with the display 12.

The display 12 is movable from a storage position shown in FIG. 2A to a separate position shown in FIG. 2C. At the storage position, the display 12 is stored in the body 10. At the separate position, the display 12 is separated from the body 10. In a normal state, the display 12 is disposed at the storage position. Here, FIG. 2B shows a tilt start position and a tilt end position. A display panel 28 is formed on the front of the display 12. The display panel 28 as an indicating element indicates various information.

The driving element 14 ejects the lower side of the display 12 from the storage position to the separate position, and pulls back the lower side of the display 12 from the separate position to the storage position.

The driving element 14 includes a slide element 30, a rack gear (not shown), a pinion gear (not shown) and an electric motor 32. The slide element 30 is slidable in a front-back direction of the device 1. One end of the slide element 30 is connected to the lower side of the display 12. The rack gear is formed in the slide element 30, and the rack gear engages the pinion gear. The electric motor 32 applies rotational force to the pinion gear. The pinion gear and the electric motor 32 are disposed in the body 10.

The one end of the slide element 30 and the lower side of the display 12 are rotatably connected so that the display 12 is rotatable around a rotation axis 34, which is parallel to a left-right direction of the in-vehicle device 1.

The tilt element 16 includes a movable shaft 36 and a guide groove 38. The movable shaft 36 is formed on the upper side of the display 12. Further, the movable shaft 36 is disposed on a left side and a right side of the display 12. The guide groove 38 is formed in the body 10, and guides displacement of the movable shaft 36.

The guide groove 38 includes a front-back guiding portion 38a and an up-down guiding portion 38b. The front-back guiding portion 38a extends along with a front-back direction of the in-vehicle device 1, and guides the movable shaft 36 along with the front-back direction. The up-down guiding portion 38b extends from one end of the front-back guiding portion 38a along with an up-down direction of the device 1, and guides the movable shaft 36 along with the up-down direction. Here, the one end of the front-back guiding portion 38a is disposed on a front side of the front-back guiding portion 38a so that the one end (i.e., a front end) is a connection portion between the front-back guide portion 38a and the up-down guide portion 38b.

Thus, in a case where the movable display 12 moves from the storage position to the separate position, when the movable shaft 36 formed in the display 12 moves from the other end of the front-back guide portion 38a to the one end of the front-back guide portion 38a, displacement of the movable shaft 36 is limited by the front-back guide portion 38a. Here, the other end (i.e., a back end) of the front-back guide portion 38a is disposed on a back side of the front-back guide portion 38a. Thus, the movable display 12 is displaced in parallel along with the front-back direction, as shown in FIGS. 2A and 2B.

When the movable shaft 36 moves from the front end of the front-back guide portion 38a to a down end of the up-down guide portion 38b, the displacement of the movable shaft 36 is limited by the up-down guide portion 38b. Thus, as the movable shaft 36 descends along with the up-down guide portion 38b, as shown in FIG. 2C, the movable display 12 gradually tilts backward.

When the display 12 moves from the storage position to the separate position, the display 12 entirely moves in parallel to the front-back direction of the device 1. Then, the display 12 tilts backward.

The permanent magnet 18 and the electric magnet 20 generate magnetic force (i.e., magnetic repulsion force) for pushing the upper side of the display 12 forward so that the magnetic force assists the slide element 30 to push the display 12 forward.

When the current flowing through a coil of the electric magnet 20 is forward current, the electric magnet 20 generates the magnetic repulsion force, which acts repulsively. When the current flowing through the coil of the electric magnet 20 is backward current, the electric magnet 20 generates the magnetic attractive force, which acts attractively so that the display 12 is attracted toward the body 10.

One of the permanent magnets 18 is disposed on a left end of the display 12, and another permanent magnet 18 is disposed on a right end of the display 12. The left and right ends of the display 12 are disposed on a backside of the display and on the upper side of the display 12. The electric magnet 20 in the body 10 is opposite to (i.e., faces) the permanent magnet 18 when the display 12 is arranged in the storage position.

The permanent magnet 18 is made of alnico magnet, ferrite magnet or the like. The N pole of the permanent magnet 18 faces the body 10 when the display 12 is arranged in the storage position. When the current flows through a coil of the electric magnet 20 in the forward direction, the N pole of the electric magnet 20 faces the display 12. When the current flows through the coil in the backward direction, the S pole of the electric magnet 20 faces the display 12.

The body 10 further includes multiple reproducing elements 22 for reproducing a record media, which is inserted into the slot. The number of the slots corresponds to the number of the reproducing elements 22. As shown in FIG. 1, a panel frame 24 is formed on the front side of the body 10. The panel frame 24 surrounds the periphery of the display 12 when the display 12 is accommodated in the body 10, which is the storage position.

The panel frame 24 has an operation element 26, which includes multiple operation buttons such as an open/close button 26a and a volume control button 26b. Each operation button controls the in-vehicle device 1. For example, the open/close button 26a controls to displace the display 12 so that the slots formed in the body 10 open and close. The volume control button 26b controls the volume.

Figure 4:
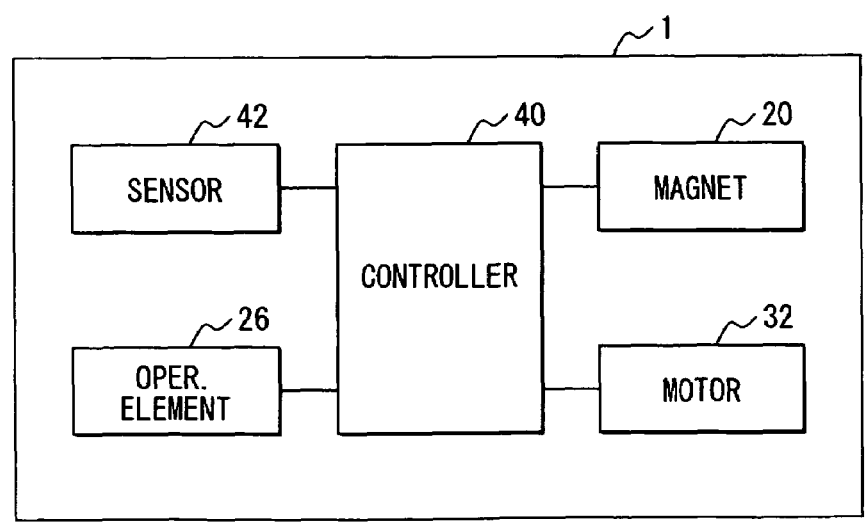
FIG. 4 is a circuit diagram showing the in-vehicle device.

FIG. 4 shows the electric structure of the in-vehicle device 1. The device 1 includes a controller 40, a position detection sensor 42, the operation element 26, the electric magnet 20 and the electric motor 32. The controller 40 includes a CPU, a ROM, a RAM and the like. An output signal from the position detection sensor 42 is input in the controller 40. The position detection sensor 42 detects the position of the slide element 30. An output signal output from the operation element 26 corresponding to operation of the operation element 26 is input in the controller 26. The controller 40 controls to energize the electric magnet 20 and the electric motor 32 based on the output signals from the sensor 42 and the operation element 26.

Figure 5:
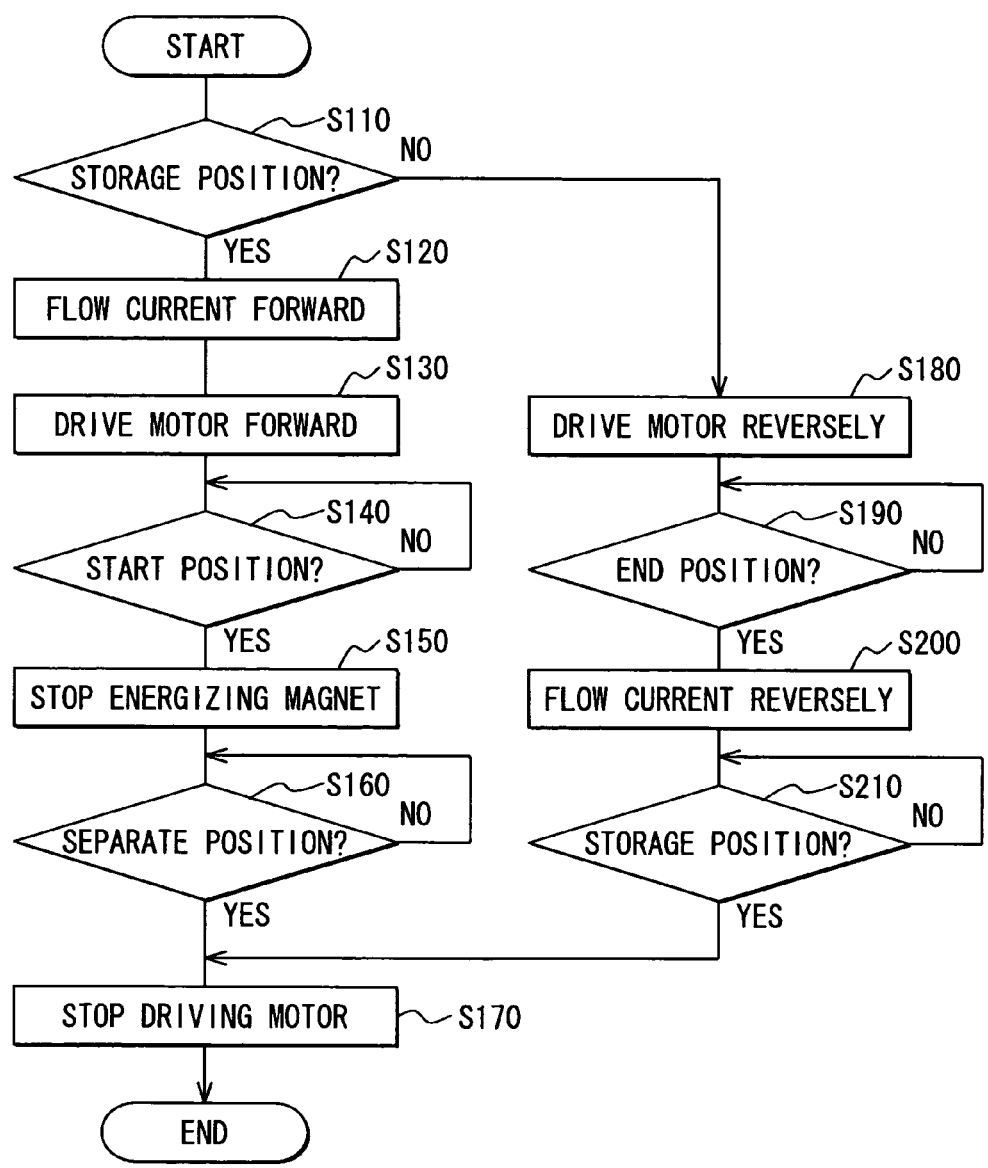
FIG. 5 is a flowchart showing a control process of the in-vehicle device.

FIG. 5 shows a flowchart of a control process, which is executed in the controller 40 of the in-vehicle device 1. The control process starts to execute when the open/close button 26a is operated.

When the control process starts, in step S110, the controller 40 determines based on the output signal of the position detection sensor 42 whether the present position of the display 12 is the storage position.

When it is determined that the display 12 is disposed at the storage position, i.e., when it is determined to be "YES" in step S110, the controller 40 controls to energize the electric magnet 20 in step S120 so that the magnetic repulsion force is generated between the electric magnet 20 and the permanent magnet 18. Specifically, the controller 40 controls to flow the forward current in the electric magnet 20. Then, in step S130, the electric motor 32 is driven in a forward rotation so that the slide element 30 moves forward in parallel to the horizontal direction of the body 10. Specifically, the controller 40 starts to energize the motor 32 so that the slide element 30 is displaced to the outside of the body 10.

In steps S120 and S130, the movable shaft 36 of the display 12 is displaced forward along with the front-back guide portion 38a of the guide groove 38. Thus, the display 12 entirely moves forward in parallel to the horizontal direction (i.e., the front-back direction) of the body 10.

After the motor 32 is driven forward in step S130, in step S140, it is determined on the basis of the output signal from the position detection sensor 42 whether the display 12 reaches a tilt starting position. At the tilt starting position, the device 1 starts to tilt the display 12, as shown in FIG. 2B. The step S140 is repeated until the display 12 reaches the tilt starting position.

Here, a state that the display 12 reaches the tilt starting position means that the movable shaft 36 of the display 12 reaches the connection portion between the front-back guide portion 38a and the up-down guide portion 38b, as shown in FIG. 2B.

When it is determined in step S140 that the display 12 reaches the tilt starting position, i.e., when it is determined to be "YES" in step S140, the device 1 stops energizing the electric magnet 20 in step S150. The magnetic repulsion force between the electric magnet 20 and the permanent magnet 18 disappears. After that, the movable shaft 36 of the display 12 moves downward along with the up-down guide portion 38b of the guide groove 38, so that the display 12 tilts backward.

When the device 1 stops energizing the electric magnet 20 in step S150, it is determined in step S160 on the basis of the output signal from the position detection sensor 42 whether the present position of the display 12 is the separate position. Specifically, the display 12 moves toward the separate position in accordance with forward rotation of the electric motor 32. The step S160 is repeated until it is determined that the display 12 reaches the separate position.

When it is determined in step S160 that the display 12 reaches the separate position, i.e., when it is determined to be "YES" in step S160, the device 1 stops driving the electric motor 32 in step S170. Thus, the process ends.

When it is determined in step S110 that the display 12 is not disposed at the storage position, when it is determined to be "NO" in steps S110, it is determined that the display 12 is disposed at the separate position. In this case, the motor 32 drives backward in step S180, i.e., the motor 32 rotates in the backward direction.

Thus, the display 12 moves from the separate position to the storage position, so that the display moves toward the body 10. Accordingly, the display gradually stands up along with the up-down guide portion 38b.

When the device 1 starts to drive the motor 32 backward in step S180, it is determined on the basis of the output signal from the position detection sensor 42 in step S190 whether the display 12 reaches the tilt ending position. At the tilt ending position, the device 1 ends to tilt the display 12. The step S190 is repeated until it is determined that the display reaches the tilt ending position.

The tilt ending position is the same position as the tilt starting position. Specifically, a state that the display 12 reaches the tilt ending position means that the movable shaft 36 of the display 12 reaches the connection portion between the up-down guide portion 38b and the front-back guide portion 38a.

When it is determined in step S190 that the display 12 reaches the tilt ending position, i.e., when it is determined to be "YES" in step S190, the device 1 starts to energize the electric magnet 20 in step S200 so that the magnetic attractive force is generated between the electric magnet 20 and the permanent magnet 18.

Here, the magnetic attractive force is always generated between the electric magnet 20 and the permanent magnet 18 during a period from the time when the display 12 reaches the tilt ending position to the time when the open/close button 26a is operated.

When the magnetic attractive force is generated in step S200, it is determined on the basis of the output signal from the position detection sensor 42 in step S210 whether the display 12 reaches the storage position. The step S210 is repeated until it is determined whether the display 12 reaches the storage position.

When it is determined that the display 12 reaches the storage position, i.e., when it is determined to be "YES" in step S210, the device 1 stops driving the electric motor 32 in step S170. Thus, the control process ends.

The magnetic repulsion force generated between the electric magnet 20 in the body 10 and the permanent magnet 18 in the display 12 is used as auxiliary force for pushing the display 12 from the storage position to the separate position. Thus, the device 1 does not include auxiliary force generation system having a spring, an ejecting lever, a support member and the like. The device 1 merely includes the permanent magnet 18 and the electric magnet 20, which are assembled in the body 10 and the display 12, respectively.

Since the magnetic force becomes larger as the distance between the magnets 18, 20 becomes small. Accordingly, the device 1 can generate sufficiently large auxiliary force for moving the display 12 by using a limited space. Thus, the design of the magnets 18, 20 for generating sufficiently large magnetic force can be easily performed.

Thus, the design of the device 1 becomes simple. Further, when the display 12 is displaced from the storage position to the tilt starting position, the device 1 energizes the electric magnet 20 so as to generate the magnetic repulsion force between the electric magnet 20 and the permanent magnet 18.

Accordingly, the magnetic repulsion force pushes the display 12 forward, so that the repulsion force assists parallel displacement of the display 12. Thus, the display 12 moves from the storage position to the separate position smoothly.

When the display 12 is disposed at the storage position, the device 1 energizes the electric magnet 20 so as to generate the magnetic attractive force between the electric magnet 20 and the permanent magnet 18.

Thus, the display 12 is attracted to the body 10 by the magnetic attractive force so that the display 12 is fixed at the storage position. Thus, the display 12 is prevented from jouncing with respect to the body 10 even when the vehicle vibrates. Further, the device 1 protects the display 12 from generating abnormal noise, so that elements in the device 1 are protected from being damaged. Further, since the display 12 is prevented from jouncing, resistance to vibration in the device 1 is improved.

Since the electric magnet 20 is arranged in one of the body 10 and the display 12, and the permanent magnet 18 is arranged in the other one of the body 10 and the display 12, the construction of the device 1 is simplified, compared with a case where the electric magnets 20 are arranged in each of the body 10 and the display 12.

Further, since the electric magnet 20 is formed in the body 10, and the permanent magnet 18 is formed in the display 12, it is not necessary for the display 12 to form a wiring for energizing the electric magnet 20. Accordingly, the wiring in the device 1 is simplified, compared with a case where the electric magnet 20 is formed in the display 12, and the permanent magnet 18 is formed in the body 10. Further, the weight of the device 1 is reduced.

The movable display 12 corresponds to a movable element, the driving element 14 corresponds to a pressurizing element or pushing element, the permanent magnet 18 and the electric magnet 20 correspond to a magnetic attractive force generating element, the tilt element 16 corresponds to an inclining element, and the display panel 28 corresponds to a display element.

Although the display panel 28 is formed in the display 12, the display panel 28 may be formed in an element other than the display 12.

Further, the in-vehicle device is mounted in the vehicle. Alternatively, the movable element may be mounted on a device other than the in-vehicle device 1.

In the device 1, the display 12 tilts backward after the display entirely moves in parallel to the horizontal direction of the device 1, so that the slots are opened, i.e., exposed. The slots are formed in the body 10. In this case, the display 12 is displaced from the storage position to the separate position. Alternatively, the display 12 merely tilts backward so that the slots are opened. Alternatively, the slots may be opened without tilting the display 12.

Although the electric magnet 20 is formed in the body 10, and the permanent magnet 18 is formed in the display 12, the electric magnet 20 may be formed in the display 12, and the permanent magnet 18 may be formed in the body 10.

The electric magnet 20 may be formed on each side of the body 10 and the display 12. Further, the permanent magnet 18 may be formed on each side of the body 10 and the display 12. In this case, one pole of the permanent magnet 18 has the same pole as one pole of the other permanent magnet 18, the one pole of the magnet 18 facing the one pole of the other magnet 18.

The magnetic repulsion force and the magnetic attractive force are generated by a pair of the magnets 18, 20. Alternatively, the magnetic repulsion force and the magnetic attractive force may be generated by two or more pairs of the magnets 18, 20.

The magnet as the magnetic attractive force generating element may be formed in the body 10, and a metallic member may be formed in the display 12, the metallic member facing the magnetic attractive force generating element.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A transforming device comprising:
    a body;
    a movable element movable between a storage position, in which the movable element is accommodated in the body, and a separate position, in which the movable element is separated from the body;
    a rotation axis around which the movable element is rotatable;
    a pushing element for pushing the movable element in the storage position; and
    a pair of magnets, wherein
    one magnet is disposed in the body, and the other magnet is disposed in the movable element, and
    the pair of magnets is configured to generate auxiliary force for assisting the pushing of the movable element in the storage position, and causing the movable element to rotate around the rotation axis to be in the separate position.

2. The transforming device according to claim 1, further comprising:
    an energization control element, wherein
    one of the magnets is an electric magnet,
    the energization control element controls to energize the electric magnet in such a manner that repulsive force is generated between the pair of magnets when the pushing element pushes the movable element in the storage position, and
    the energization control element controls to energize the electric magnet in such a manner that attractive force is generated between the pair of magnets when the movable element is in the storage position.

3. The transforming device according to claim 2, wherein the other one of the magnets is made of a permanent magnet.

4. The transforming device according to claim 3, wherein the electric magnet is disposed in the body, and the permanent magnet is disposed in the movable element.

5. The transforming device according to claim 1, further comprising:
a magnetic attractive force generating element for generating magnetic attractive force to attract the movable element toward the body, wherein
the magnetic attractive force generating element is disposed in at least one of the body and the movable element.

6. The transforming device according to claim 1, further comprising:
a tilting element for tilting the movable element toward the body when the movable element moves from the storage position to the separate position.

7. The transforming device according to claim 1, wherein the movable element includes a display for displaying information.

8. The transforming device according to claim 7, wherein the body includes a vehicle navigation device and a vehicle audio device, and
the movable element is the display for the vehicle navigation device and the vehicle audio device.

9. The transforming device according to claim 1, further comprising:
a position detection means for detecting a position of the movable element; and
an operation switch for receiving a request to move the movable element, wherein
the pair of magnets is configured to therebetween generate repulsive force for displacing the movable element from the body in response to an operation of the operation switch when the position detection means detects that the movable element is in the storage position, and
the pair of magnets is configured to terminate the repulsive force in response to detection of the position detection means that the movable element is away from the storage position by a predetermined degree subsequent to the operation of the operation switch.

10. The transforming device according to claim 9, wherein the pair of magnets is configured to therebetween generate attractive force for fixing the movable element in the storage position in response to detection of the position detection means that the movable element is in the storage position.

11. A transforming device comprising:
a body;
a movable element movable between a storage position, in which the movable element is accommodated in the body, and a separate position in which the movable element is separated from the body;
a rotation axis around which the movable element is rotatable;
a slide element for pushing the movable element from the storage position to the separate position and for pulling the movable element from the separate position to the storage position;
a permanent magnet disposed in the movable element; and
an electric magnet disposed in the body, wherein
the electric magnet is configured to generate repulsive force between the electric magnet and the permanent magnet for assisting the pushing of the movable element in the storage position and causing the movable element to rotate around the rotation axis to be in the separate position; and
the electric magnet is configured to generate attractive force between the electric magnet and the permanent magnet when the movable element is in the storage position.

12. The transforming device according to claim 11, wherein
the movable element is movable in two steps between the storage position and the separate position,
one step is a first step, in which the movable element moves between the storage position and a tilt starting position,
the other step is a second step, in which the movable element moves between the tilt starting position and the separate position,
the slide element pushes and pulls the movable element in the first step in such a manner that the movable element moves in parallel to a front surface of the body, and
the slide element pushes and pulls the movable element in the second step in such a manner that the movable element is rotated around the rotation axis and tilted toward the front surface of the body.

13. The transforming device according to claim 12, wherein
the body includes a vehicle navigation device and a vehicle audio device, and
the movable element is a display for the vehicle navigation device and the vehicle audio device.

14. The transforming device according to claim 12, further comprising:
a position detection means for detecting a position of the movable element; and
an operation switch for receiving a request to move the movable element, wherein
the electric magnet is configured to generate the repulsive force in response to an operation of the operation switch when the position detection means detects that the movable element is in the storage position, and
the electric magnet is configured to terminate the repulsive force in response to detection of the position detection means that the movable element is in the tilt staffing position in the first step subsequent to the operation of the operation switch.

15. The transforming device according to claim 14, wherein
the pair of magnets is configured to therebetween generate attractive force for fixing the movable element in the storage position in response to detection of the position detection means that the movable element is in the storage position.

16. A transforming device comprising: a body; a movable element movable between a storage position, in which the movable element is accommodated in the body, and a separate position, in which the movable element is separated from the body; a rotation axis around which the movable element is rotatable; a pair of magnets including one magnet, which is disposed in the body, and the other magnet, which is disposed in the movable element; a position detecting means for detecting a position of the movable element; and an operation switch for receiving a request to move the movable element, wherein the pair of magnets is configured to therebetween generate repulsive force for causing the movable element in the storage position to be displaced to an outside of the body and causing the movable element to rotate around the rotation axis to be in the separate position, the pair of magnets is further configured to therebetween generate repulsive force for displacing the movable element from the body in response to an operation of the operation switch when the position means detects the movable element is in the storage position, and the pair of magnets is further configured to terminate the repulsive force in response to detection of the position detection means that the movable element is away from the storage position by a predetermined degree subsequent to the operation of the operation switch.

17. The transforming device according to claim 16, wherein
the pair of magnets is configured to therebetween generate attractive force for fixing the movable element in the storage position in response to detection of the position detection means that the movable element is in the storage position.

* * * * *